July 26, 1932. W. W. HESTER 1,868,833
APPARATUS FOR INDICATING ANGULARITY OF CROOKED WELL HOLES
Filed July 26, 1929 2 Sheets-Sheet 1
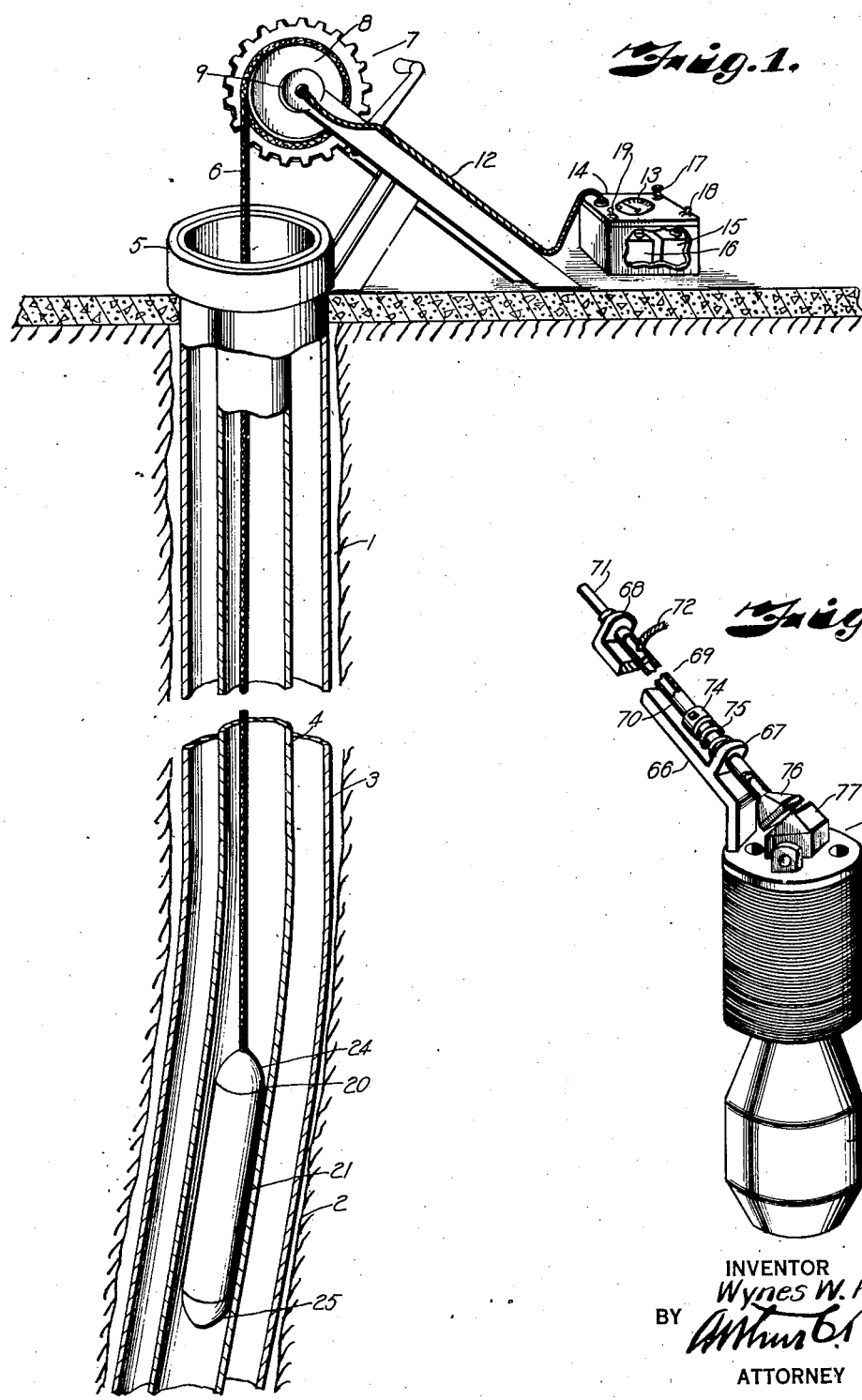
INVENTOR
Wynes W. Hester
BY
ATTORNEY

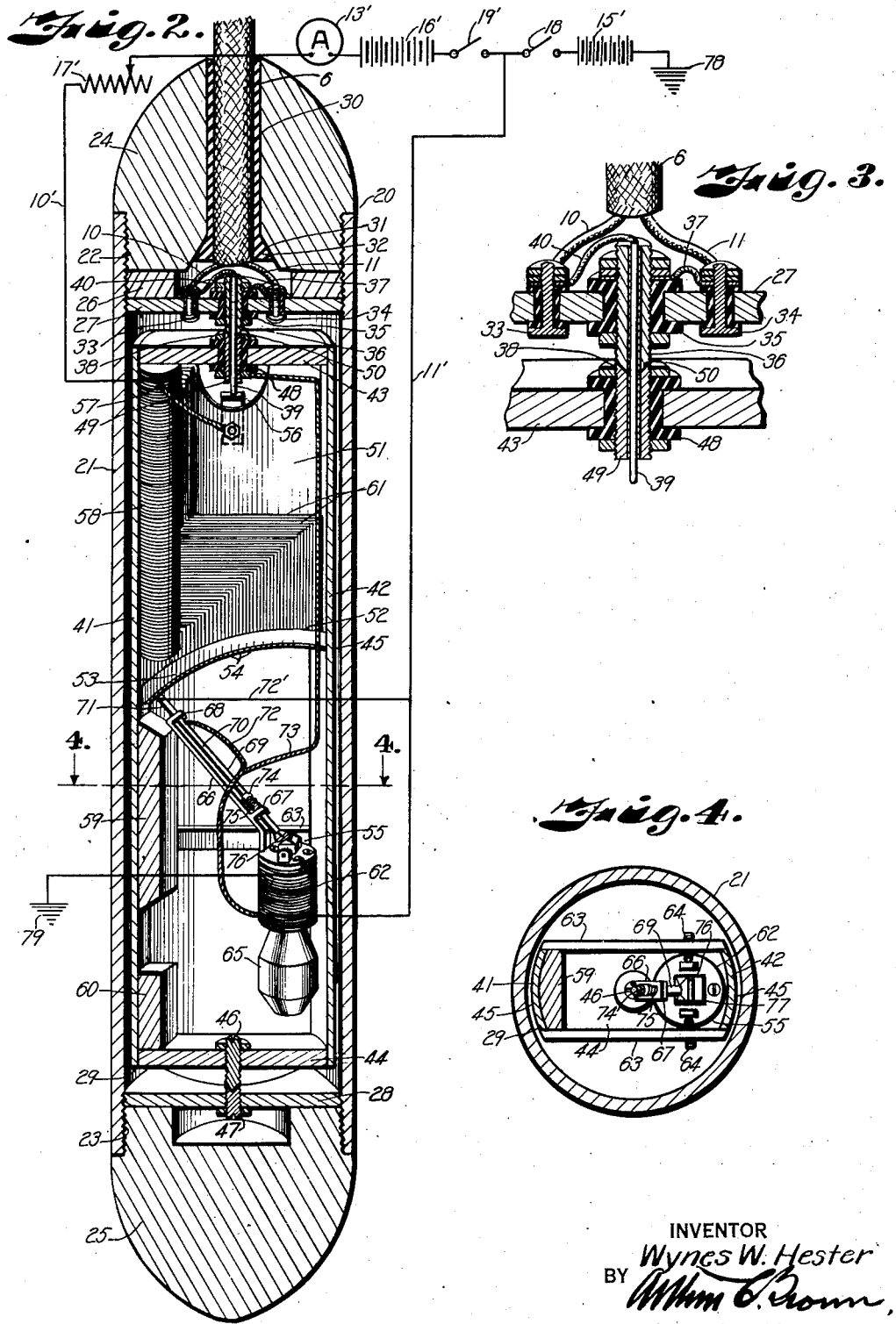

Patented July 26, 1932

1,868,833

UNITED STATES PATENT OFFICE

WYNES W. HESTER, OF TULSA, OKLAHOMA, ASSIGNOR TO DRIFTMETER, INCORPORATED, OF TULSA, OKLAHOMA, A CORPORATION OF OKLAHOMA

APPARATUS FOR INDICATING ANGULARITY OF CROOKED WELL HOLES

Application filed July 26, 1929. Serial No. 381,364.

My invention relates to apparatus for indicating angularity of crooked well holes and has for its principal object to provide an instrument whereby such indications may be taken at will throughout the depth of a well.

In accomplishing such object of the invention I have provided improved details of structure, the preferred forms of which are illustrated in the accompanying drawings, wherein:

Fig. 1 is a central, longitudinal section through a well equipped with my improved apparatus.

Fig. 2 is an enlarged central longitudinal section through the resistance instrument showing a diagram of the electric circuit with the contact pendulum and resistance contacts in relative position for producing a true vertical indication.

Fig. 3 is an enlarged vertical section of the contact bearings at the upper end of the resistance instrument.

Fig. 4 is a transverse section on the line 4—4 Fig. 2.

Fig. 5 is an enlarged detail perspective view of the contact pendulum with parts broken away for better illustration.

Referring in detail to the drawings:

1 designates a well hole herein shown as having an inclined portion 2 and equipped with the usual casing 3 and tubing 4 supported from the casing head 5, the head being open for receiving a cable 6 for lowering into the tubing by a windlass 7.

The windlass drum 8 is provided at one end with a commutator type connector 9, connecting the branches 10 and 11, (Fig. 2), of the cable 6 with like branches (not shown) of the cable 12 leading to an ammeter 13 calibrated for indicating degrees of deflection. The ammeter 13 is mounted in a container 14 inclosing storage batteries 15 and 16 and fitted with an adjustable resistance member 17 and control switches 18 and 19. Connected in circuit with the ammeter through the cables 6 and 12 is a resistance instrument 20 attached to the free end of the cable 6 for lowering into the well and embodying the principal features of the invention as presently described.

The resistance instrument 20 includes a cylindrical housing member 21 adapted to slide freely through the well tubing and having internally threaded ends 22 and 23 fitted with removable bullet-shaped heads 24 and 25 for guiding the housing during its descent into and withdrawal from the well.

Spaced from the head 24 by spacer collar 26 is a bearing plate 27 cooperating with a bearing plate 28 in the opposite end of the housing for pivotally mounting a frame 29 containing the operating parts of the apparatus.

Extending centrally through the head 24 is an opening 30 having a tapered portion 31 at its lower end filled with solder 32 or the like for securing the end of the cable 6 in the opening.

Mounted on the bearing plate 27 are insulated binding posts 33 and 34 connected with the branches 10 and 11 of the cable 6, and located between the binding posts is an insulator bushing 35 fitted with a contact bearing sleeve 36 connected with the binding post 34 by a branch 37, and provided with a tapered end 38. Fixed in and insulated from the bearing sleeve is a contact pin 39 connected with the binding post 33 by a branch 40, with its lower end projecting from the tapered end 38 of the bearing sleeve 36, the sleeve and contact pin being adapted for cooperation with parts of the support frame 29 presently described.

The support frame 29 includes vertical side members 41 and 42 connected at opposite ends by head plates 43 and 44, and having arcuate surfaces 45 spaced from the walls of the housing to permit rotation of the frame.

Secured in the lower head plate 44 is a pivot screw 46 engaging a pivot stud 47 in the bearing plate 28, and mounted in the upper head plate is an insulator bushing 48 fitted with a sleeve 49 receiving the contact pin 39 for free rotation therein, and having a recessed end 50 engaging the tapered end 38 of the bearing sleeve 36, thus supporting the frame on point bearings for free rotation in the housing.

Mounted in the upper end of the support frame 29 is a panel 51 having an arcuate lower edge 52 fitted with a commutator or contact sector 53 comprising a plurality of contacts 54 insulated from each other and cooperating with a pendulum switch arm 55 hereafter described.

Secured to the upper end of the panel is a contact member 56 engaging the end of the contact pin 39, and leading from the contact member is a branch wire 57 connecting with one end of a resistance coil 58 supported from the panel 51 adjacent the frame member 41.

Attached to the lower end of the frame member 41 are weights 59 and 60 for weighting the member and causing the frame to automatically swing on its pivots so that the weighted side will assume the lower position when the device is inclined.

Leading from various points on the resistance coil are branches 61 connected with respective contacts 54 of the commutator and effecting a graduated resistance throughout the arcuate length of the commutator 53.

The pendulum switch arm 55 includes an electro-magnet 62 pivotally supported at one side of the frame 29 opposite the weighted side member 41, and from paired cross bars 63 (Fig. 4) by means of pivot screws 64 having an axis common to the axis of the commutator 53.

Depending from the lower end of the electro-magnet 62 is a weight 65 adapted for maintaining the electro-magnet in a substantially vertical position regardless of inclination of the body of the device, and supported on the upper end of the magnet is a bracket 66 extending angularly upward in radial alignment with the commutator 53 and having spaced and apertured ears 67 and 68, for the mounting of a contact member 69.

The contact member 69 includes an insulator sleeve 70 slidably engaged in the ears 67 and 68, and fitted at its upper end with a contact rod 71 movable with the sleeve for engaging the contacts 54 of the commutator 53. The rod is connected through a branch 72 with a branch 73 having one end grounded to the support frame through the electro-magnet 62 and pivot screws 64, and its opposite end connected with the branch 11 of the cable 6 through the bearing sleeves 36 and 49.

Mounted on the sleeve 70 in spaced relation with the ear 67 is a collar 74, and interposed between the ear and collar is a coil spring 75 normally and yieldingly urging the contact rod into engagement with the commutator contacts 54.

Attached to the lower end of the insulator sleeve 70 is a metallic head 76 cooperative with a head 77 on the electro-magnet to shift the contact rod 71 from engagement with the commutator contacts 54 and permit free pivotal movement of the pendulum switch arm relative to the commutator when the magnet is energized.

In the wiring diagram shown in Fig. 2, the primary elements of the electric circuits are represented diagrammatically in relation to the principal mechanical elements heretofore described, the storage battery 15' being grounded as shown at 78 and connected through switch 18, with line 11' leading to the electro-magnet 62.

Leading from the positive pole of the battery 16' is the line 10' connected with one end of the resistance coil 58 and including the ammeter 13' and the adjustable resistance member 17' for controlling the resistance in the line.

The resistance coil 58 is connected with the commutator 53 through the branches 61, and leading from the contact rod 71 cooperating with the commutator is the branch 72' connected with the line 11' which may be connected in circuit with the negative pole of the battery 16' by the switch 19' for establishing flow of electric current through the ammeter 13'.

In using the apparatus the switches are opened and the resistance instrument is lowered into the well. As the instrument descends it assumes the same inclinations as the well hole through which it passes, the pivoted inner frame turning on its point bearings under influence of its weights and the magnet assuming the same inclinations as its carrying body due to frictional contact of the rod 71 with the commutator 53.

When an indication is to be taken the instrument is stopped and the switch 18 closed, energizing the magnet to free the rod from the commutator, so that if the plunger is in an inclined portion of the well the magnet swings to perpendicular position, carrying the rod 71 along, but out of contact with the commutator to an extent determined by angularity of the well hole at that point. The switch 18 is then opened, deenergizing the magnet and permitting the rod 71 to be extended by its spring to contact with the commutator. The switch 19 is then closed to permit flow of current through the resistance coil 58 and its branch 61 corresponding to the commutator member 54 with which the rod 71 is in contact and through the ammeter, whereupon the ammeter is actuated according to the amount of current passing the resistance coil and indicates the degree of angularity of the portion of the well within which the instrument is located, depth of the well at that point being shown by the commutator on the windlass 7.

Thus indications may be taken at various depths by stopping the instrument during its up or down travel and opening and closing the switches to control flow of current through the magnet and coil lines, the adjustable resistance member 17' in the ammeter circuit being regulated to compensate for the varying depths of different wells.

I claim:—

1. In apparatus of the character described, a cylindrical housing, a resistance unit in the housing including a pivotally supported frame, a variable resistance coil on said frame, an arcuate commutator comprising a series of contacts connected with said coil, a pendulum pivotally supported on said frame on a common center with said arc of the commutator and including a contact rod normally and yieldingly urged to selective engagement with said commutator contacts, an ammeter in circuit with said coil and contacts for indicating flow of electric current therethrough, a secondary circuit including an electro-magnet on said pendulum for controlling engagement of said contact rod with said commutator contacts, and independently operable switches controlling said primary and secondary circuits.

2. In apparatus of the character described, a cylindrical housing, a resistance unit in the housing including a pivotally supported frame, a pendulum pivotally supported adjacent one side of the frame, a variable resistance coil on the frame, a commutator formed on an arc with said pendulum pivot and comprising a series of contacts connected with said coil, a contact rod on the pendulum normally engaging the commutator, an ammeter in circuit with said coil and contacts for indicating flow of electric current therethrough, a secondary circuit including an electro-magnet on said pendulum for retracting the contact rod out of engagement with the commutator contacts, and independently operable switches controlling said primary and secondary circuits.

3. Apparatus of the character described including a housing, means for suspending the housing to permit the housing to assume an angularity conforming to that of the portion of a well hole within which it is contained, a series of contacts within the housing, a member pivotally mounted in said housing and weighted to automatically assume vertical position when unrestrained, a contact rod carried by said weighted member, a circuit including the contacts and contact rod, a resistance unit in the circuit, a series of branch wires leading respectively from different parts of said unit to the contacts to effect a variable flow of current through the circuit upon movement of the contact rod, an indicator in said circuit responsive to variable current flowing in the circuit, a magnet on said weighted member controlling contact of the contact arm with the commutator, a secondary circuit including the magnet, and control switches in the respective circuits.

4. In a device of the character described comprising a frame, a plurality of contacts on said frame in the form of an arc, and a gravity actuated contacting member comprising a weight pivotally mounted at its upper end to said frame on a common center with said arc, a contact rod mounted on said weight, resilient means urging said rod into engagement with said contacts, an electromagnet on said weight adjacent one end of said rod, and means on said rod to cause it to move out of engagement with said contacts upon energization of said magnet.

5. In a device to indicate the inclination of a well bore, a commutator, a contacting member for cooperating with said commutator including a contact rod, resilient means urging said rod into engagement with said commutator, an electro-magnet on said contacting member, and means on said rod to move the rod out of engagement with said commutator when said magnet is energized.

6. In a device to indicate the inclination of a well bore, a casing, an electrical resistance coil in said casing, a commutator having a plurality of contacts connected with said coil, a contact rod completing a circuit through said coil, resilient means constantly urging said rod into engagement with said contacts, and means operable from a point remote from said rod to move it out of engagement with said contacts.

7. In a device to indicate the inclination of a well bore, a casing, an electrical resistance coil in said casing, a commutator having a plurality of contacts connected with said coil, a contact rod completing the circuit through said coil, resilient means constantly urging said rod into engagement with said contacts and electro-magnetic means to move said rod out of engagement with said contacts.

8. In a device to indicate the inclination of a well bore, a casing, an electrical resistance coil in said casing having a plurality of contacts, a contact rod completing the circuit through said coil, resilient means urging said rod into engagement with said contacts, an electro-magnetic means to move said rod out of engagement with said contacts, and means to operate said last named means at a point remote therefrom.

9. In apparatus of the character described, a housing, a unit pivotally mounted in the housing including a fixed member and a pendulum, a contact member, means for reciprocably mounting said contact member on the pendulum to permit engagement of said contact member with the fixed member, electro-magnetic means for moving the contact member in one direction, and yielding means for moving said contact member in the opposite direction.

In testimony whereof I affix my signature.

WYNES W. HESTER.